…

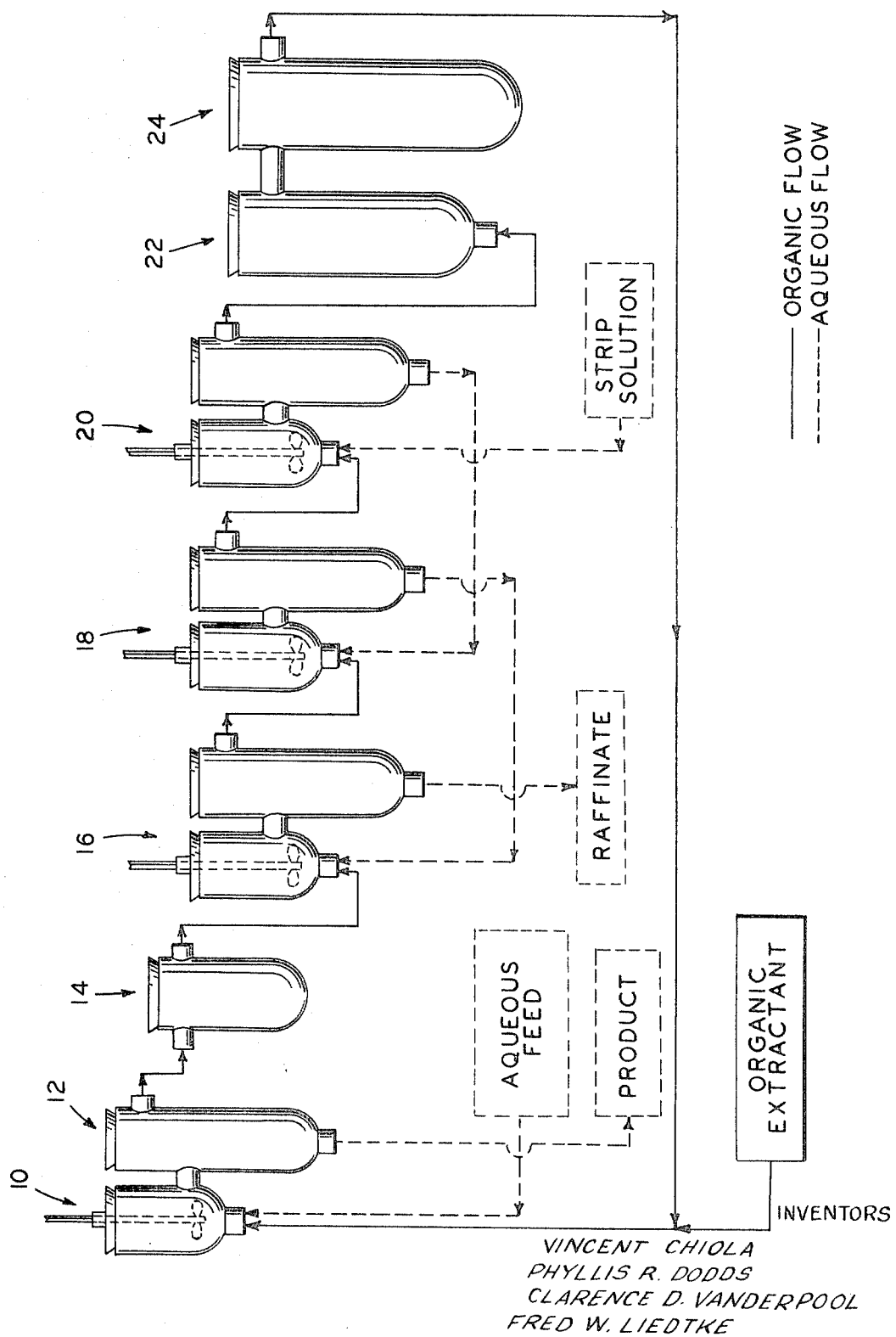

United States Patent Office 3,591,331
Patented July 6, 1971

---

3,591,331
PROCESS FOR PRODUCING AMMONIUM METATUNGSTATE
Vincent Chiola, Towanda, Phyllis R. Dodds, Wysoc, and Fred W. Liedtke and Clarence D. Vanderpool, Towanda, Pa., assignors to Sylvania Electric Products Inc.
Filed June 30, 1969, Ser. No. 837,613
Int. Cl. C22b 59/00; C01g 41/00
U.S. Cl. 23—22                                    9 Claims

ABSTRACT OF THE DISCLOSURE

A process for producing ammonium metatungstate from ammonium tungstate without an appreciable formation of ammonium paratungstate is disclosed. The process comprises contacting an aqueous ammonium tungstate solution having a pH of at least about 9 with an organic extractant solution comprising di - 2 - ethylhexyl phosphoric acid, and a water-insoluble hydrocarbon solvent, said components being in specified ratios to extract ammonium ions from the aqueous solution, separating the resultant aqueous solution from the organic solution, heating said aqueous solution to a temperature of at least about 60° C. for at least about 1 hour and recovering an essentially pure ammonium metatungstate.

BACKGROUND OF THE INVENTION

This invention relates to an improved method for preparing ammonium metatungstate. Specifically, it relates to a liquid-liquid solvent extraction process for converting ammonium tungstate solution directly to ammonium metatungstate solution, which has an ammonia to tungsten ratio and pH characteristics suitable for making crystalline ammonium metatungstate.

A general review of older methods of preparing ammonium metatungstate solution and crystalline ammonium metatungstate can be obtained from U.S. Pat. 3,175,881.

In U.S. Pat. 2,703,789 there is described a method of preparing ammonium metatungstate solution wherein an aqueous suspension of tungstic acid is digested with slightly more than the stoichiometric ammonium hydroxide necessary to form ammonium metatungstate, $(NH_4)_6H_2W_{12}O_{40}$. Unreacted tungstic acid and by-product ammonium paratungstate (APT) are separated by filtration. The filtrate product is ammonium metatungstate (AMT) solution from which the desired crystalline product can be obtained. The process has several disadvantages, as for example, poor efficiency of converting $WO_3$ to ammonium metatungstate since yields are only about 50–55 percent of theoretical. It is also generally restricted to batch processing. Additionally, processing difficulties are caused by the necessity to recover undissolved tungstic acid and by-product ammonium paratungstate. The tungstic acid sludges that are formed are difficult to filter or otherwise remove.

An improvement on this method with respect to yields and processing is described in the aforementioned U.S. Pat. No. 3,175,881.

Ammonium metatungstate is made from ammonium paratungstate (APT) by a process involving:

(1) Baking APT at 500–500° F. until about 5–6% of the starting weight is lost;
(2) digesting the baked material in deionized water to form a solution containing about 9–10% dissolved solids and some insolubles, such as $WO_3$;
(3) digesting and evaporating the solution to about ⅓ of its starting volume while maintaining a pH of about 3.5–4.0 in order to effect conversion of tungstate species to metatungstate species;
(4) collecting solutions of concentrated ammonium metatungstate for crystallization, such as by evaporation, spray-drying, and the like.

Although the beforementioned process overcomes some of the disadvantages of the prior art, baking of APT is critical and requires close control. Theoretically it is possible to cause release of ammonia from $$APT((NH_4)_{10}W_{12}O_{41} \cdot xH_2O)$$

to the level required for conversion to AMT i.e.
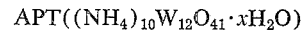
$$((NH_4)_6H_2W_{12}O_{40} \cdot xH_2O)$$

In practice this is somewhat difficult to control for maximum conversion. Also, temperature control is extremely critical and therefore, the process is difficult to obtain satisfactorily on a production scale. Overheating can result in an excessive loss of ammonia and the formation of high levels of $WO_3$ that must be removed from the AMT solution. Insufficient heating can result in the excessive presence of APT in the product AMT solution. On crystallization of AMT, the APT comes out of solution first and must be removed in order to produce completely water-soluble AMT products. Similarly, spray-drying of AMT solutions that contain small percentages of APT results in incompletely soluble AMT products (APT is soluble to the extent of 2–3% in aqueous media at room temperature). As a consequence, the process is only 70–80% efficient, based on conversion of APT to AMT crystals. Preferably, it is desired to produce an AMT solution that can be readily crystallized or spray-dried to produce a product that is water-soluble and results in water-clear solutions. Another disadvantage of this process is the intermittent batch nature necessary for production of commercial quantities. Baking, digesting, filtering and concentrating of solutions before crystallization are time consuming and costly, stepwise operations.

It is believed, therefore, that a process that directly converts an ammonium tungstate solution to a precursor ammonium metatungstate solution without many time consuming and costly steps and is suitable for a continuous operation is an advancement in the art.

SUMMARY OF THE INVENTION

In accordance with one aspect of the invention, there is provided a process for producing ammonium metatungstate that directly converts a normal ammonium tungstate solution to an ammonium metatungstate solution without an appreciable formation of ammonium paratungstate. The process comprises contacting an aqueous normal ammonium tungstate solution, that is one containing normal tungstate ions, $(WO_4)^{-2}$, and having a pH above about 9 with a two-component water-insoluble organic extractant solution consisting essentially of a di-2-ethylhexyl phosphoric acid and a water-insoluble hydrocarbon solvent in volumetric ratios of from about 1:2 to about 8:1 and preferably from about 1:1 to about 1:3 to extract ammonium ions from the ammonium tungstate solution and thereby lowering the pH of said aqueous solution to at least about 4.5, whereby metatungstate ions, $(H_2W_{12}O_{40})^{-6}$ are formed, separating the aqueous solution from the organic solution, heating the aqueuos solution containing metatungstate ions to a temperature of at least about 60° C. for at least about 1 hour and recovering an essentially pure ammonium metatungstate.

In accordance with another aspect of this invention, there is provided a stripping process whereby the organic extractant solution is regenerated for reuse in the ammonium extraction step.

BRIEF DESCRIPTION OF THE DRAWING

The figure is a flow sheet of a typical process utilizing the present invention.

DESCRIPTION OF THE PREFERRED EMBODIMENTS

For a better understanding of the present invention, together with other and further objects, advantages and capabilities thereof, reference is made to the following disclosure and appended claims in connection with the above-described drawing and description of some of the aspects of the invention.

The present invention is based upon the discovery of a method of directly converting ammonium tungstate solution to the precursor ammonium metatungstate solution required for making crystalline ammonium metatungstate. Surprisingly, it has been found that normal tungstate ions, $WO_4^{-2}$, as present in ammoniacal solutions, usually with excess ammonium ions will convert to the complex higher-molecular weight metatungstate ions $(H_2W_{12}O_{40})^{-6}$ by a process of rapidly removing ammonium ions and simultaneously reducing the pH to the range 3–4.5, where the existence of metatungstate ions is well established. Further, the reduction in ammonium ion concentration and accompanying drop in pH from greater than about 9 to about 3–4.5 is accomplished without precipitation of by-products. It is common practice to prepare ammonium paratungstate $(NH_4)_{10}W_{12}O_{41} \cdot xH_2O$, by reducing the pH of normal ammonium tungstate solution to below about 7–7.5. The pH reduction can be accomplished by addition of a mineral acid such as HCl or by evaporation to volatilize ammonia. It has heretofore been difficult to prepare ammonium tungstate solutions approaching the neutral pH point of 7 without precipitating ammonium paratungstate.

It has been found that rapid transformation and conversion of normal ammonium tungstate solution to ammonium metatungstate solution can be accomplished by liquid-liquid solvent extraction of ammonium ion using a cation a cation extraction agent. The cation extractant is di-2-ethylhexyl phosphoric acid, D–2–EHPA, in a water-insoluble hydrocarbon solvent or diluent. By water-insoluble it is meant that less than about 5 grams of the hydrocarbon will dissolve in 100 cc. of water at 25° C.

Although a two-component extractant solution can be used in volumetric ratios, D–2–EHPA to solvent, of from about 1:2 to about 8:1 respectively, it is preferred to utilize tributyl phosphate as a solubilizer or modifier. When the preferred three-component system is used, the volumetric ratio of the 3-component organic phase can range from 80:10:10 to 49:2:48, although 48.5:3:48.5 is preferred to control viscosity, pH, and solid formation, In practice of this invention, the preferred organic extractant is a mixture of di-alkyl phosphoric acid, trialkyl phosphate and a hydrocarbon diluent in a volume ratio of 48:5:3:48.5 respectively. An example of a suitable phosphate extractant is the commercially available D–2–EHPA, di-2-ethylhexyl phosphoric acid (made by Virginia-Carolina Chemical Company). The trialkyl phosphate, such as tributyl phosphate, functions as a phase conditioner or modifier to minimize or prevent emulsion and third-phase formation. The diluent component of the solvent mixture is typically kerosene, which is predominantly aliphatic in nature, and has a high flash point. Other aliphatic kerosene-type hydrocarbons can be used, as well as water-insoluble hydrocarbons having predominantly high aromatic content. Examples are toluene and S.C. No. 28 (Buffalo Solvent and Chemical Corp). The preferred organic extractant solution is di-2-ethylhexyl phosphoric acid (D–2–EHPA) mixed with tri-n-butyl phosphoric acid as a modifier and kerosene as the solvent or diluent in volumetric ratios of 48.5:3:48.5, respectively.

The ammonium tungstate feed solution can be prepared by any of the previously known procedures including the solvent extraction processing of tungsten values, the dissolution of tungsten acid in ammonium hydroxide, and the like.

The concentration of ammonium tungstate in the starting feed solution can vary from about 100 g./liter to about 200 g./l., $WO_3$ basis. A feed solution of from about 130 to about 150 g./liter $WO_3$ basis, preferred from a capacity and equipment-investment viewpoint on the basis of cost per unit of tungsten processed.

The organic and aqueous volumetric ratio can range from about 30:1 to about 1:2. About a 10:1 to about 20:1 volumetric ratio is preferred to control separation, pH, APT formation, and other solid formation. The pH of the AMT solution product is critical, at least about 4.5 and preferably about 3.5 or less to prevent APT forming at pH above 4.5–6.0.

After the ammonium metatungstate solution is separated from the organic solution after the extraction stage, it is heated to a temperature of at least about 60° C. for at least 1 hour, to insure that the tungstate ions are converted to the metatungstate species. Although temperatures up to about 90° C. are preferred, temperatures as low as about 60° C. can be used. Additionally, it is preferred that the solution be heated for about 2 hours at 90° C. Longer times at 90° C. are unnecessary. Therefore, from a production standpoint a temperature of about 90° C. and a time of about 2 hours is preferred.

As previously mentioned, the organic extractant solution can be regenerated for reuse by stripping the ammonium-laden solution with a mineral acid. Although any mineral acid can be used, it is preferred to use hydrochloric acid. The preferred strip solution is, therefore, an aqueous HCl solution ranging from about 0.4 N to about 4 N. A solution having about 1.2 N HCl is preferred for the best efficiency and economy.

To more fully illustrate the present invention, the following detailed example is presented.

EXAMPLE I

Referring now to the drawing in greater particularity, in the figure there is shown a series of units that can be subdivided into an extraction circuit and a stripping circuit. The extraction circuit consists of one extraction stage 10, a settling stage 12 and filtration stage 14. The stripping circuit contains three stripping stages, 16, 18 and 20, followed by a settler unit 22 and a filtering unit 24.

In the extraction circuit, aqueous ammonium tungstate solution at about pH 9.5 and containing about 135 g. $WO_3$/l., is fed concurrently at a rate of 3 ml./min. with barren or unloaded extractant, at a rate of 30 ml./min. to the extraction stage 10. Both ammonium-loaded organic and aqueous solution, now at a pH of 3.5 and specific gravity of 1.135 is collected as amonium metatungstate solution in the settling unit 12. The organic is then passed through the filtering stage 14 to remove a slight skin of insoluble material which forms during extraction. In the stripping circuit, the loaded organic solution flows to the first compartment of the stripping unit 16. At the same time the stripping solution is fed to the mixing compartment of the third stripping stage 20 at a rate of 15 m./min. Aqueous strip solution flows counter-currently to loaded organic flow, that is from stage 20 to 16 while progressively stripping and loading ammonia at each stage until it reaches the maximum or desired loading at stage 16. The loaded organic solution, while traveling countercurrently to the flow of the aqueous strip solution, becomes progressively stripped of ammonia. Fully stripped organic is passed to a settler 22 and then filtered at stage 24 to remove a slight skin of insoluble material before being recycled to the extraction stage 10 for contact with fresh ammonium tungstate solution. The ammonium metatungstate product is obtained from the settler 12 as a solution having a pH of about 3.5 and specific gravity of about 1.135. The solution is collected, digested at a relatively constant volume and a relatively constant temperature of about 90° C. for about two hours before being evaporated to solid water-soluble ammonium metatungstate. This insures conversion of all species present to AMT before the solution is taken to dryness.

In the practice of the present invention, there is produced a product comparable to that obtained by conventional processing without costly equipment tie-ups or processing difficulties.

Furthermore, as illustrated above, it can be produced on a continuous basis.

In similar runs using similar equipment, the following results are attained:

| Aqueous feed ammonium tungstate solution | | | | Organic extractant | | Raffinate | | | Product ammonium metatungstate | | Strip solution 1.2 N HCl, flow, rate, ml./min. |
|---|---|---|---|---|---|---|---|---|---|---|---|
| Run | pH | Sp. Gr. | Flow rate, ml./min. | WO³, g./l. | Vol. ratio | Flow rate, ml./min. | pH | Sp. gr. | WO³, g./l. | pH | Sp. gr. | |
| 1 | 9.4 | 1.23 | 2 | 270 | 48.5% D2EHPA, 3% TBP, 48.5% kerosene. | 40 | 0.3 | 1.020 | <0.06 | 2.95 | 1.290 | 15 |
| 2 | 9.4 | 1.23 | 3 | 135 | 48.5% D2EHPA, 3% TBP, 48.5% kerosene. | 30 | 0.3 | 1.020 | <0.06 | 2.95 | 1.290 | 15 |
| 3 | 9.7 | 1.24 | 3 | 135 | 48.5% D2EHPA, 3% TBP, 48.5% kerosene. | 30 | 0.3 | 1.025 | <0.06 | 3.15 | 1.300 | 15 |

The foregoing laboratory scale results can be scaled up to full production scale units by those skilled in engineering equipment design.

While there has been shown and described what is at present considered the preferred embodiments of the present invention, it will be obvious to those skilled in the art that various changes and modifications may be made therein without departing from the scope of the invention as defined by the appended claims.

We claim:
1. A process for producing an ammonium metatungstate solution comprising:
   (a) contacting an aqueous normal ammonium tungstate solution containing normal tungstate ions and at a pH of at least about 9 with an organic extractant solution comprising di-2-ethylhexyl phosphoric acid and a water-insoluble hydrocarbon solvent in volumetric ratios of from about 1:2 to about 8:1 to extract ammonium ions from said aqueous solution and to lower the pH thereof to at least about 4.5 to form at least some metatungstate ions;
   (b) separating said aqueous solution containing said metatungstate ions from the resultant ammonium-laden organic solution;
   (c) heating said aqueous solution at a temperature of at least about 60° C. for at least about 1 hour; and
   (d) recovering essentially pure ammonium metatungstate.

2. A processing according to claim 1 wherein said organic extractant solution contains tributyl phosphate and the volumetric ratios of di-2-ethylhexyl phosphoric acid to tributyl phosphate to said solvent wherein said solvent is kerosene, is from about 80:10:10 to about 49:2:49.

3. A process according to claim 2 wherein said ratio is 48.5:3:48.5.

4. A process according to claim 1 wherein said ammonium-laden organic solution is regenerated for reuse by removing said ammonium values from said organic solution.

5. A process according to claim 4 wherein a mineral acid strip solution is used to remove said ammonium values.

6. A process according to claim 5 wherein said mineral acid is hydrochloric acid having a normality of from about 0.4 N to about 4 N.

7. A process according to claim 3 wherein the volumetric ratio of said aqueous ammonium tungstate solution to said organic extractant solution is from 20:1 to about 1:2.

8. A process according to claim 7 wherein said ratio is from about 10:1 to about 20:1 and said metatungstate solution is heated to about 90° C. for about 2 hours.

9. A process according to claim 8 wherein the concentration of ammonium tungstate in said ammonium tungstate solution is from about 100 grams/liter to about 200 grams/liter WO₃ basis.

References Cited
UNITED STATES PATENTS

| 2,703,789 | 3/1955 | McKinley et al. | 23—51X |
| 3,175,881 | 3/1965 | Chiola et al. | 23—51 |
| 3,472,613 | 10/1969 | Hay et al. | 23—23 |

HERBERT T. CARTER, Primary Examiner

U.S. Cl. X.R.
23—23, 51